United States Patent [19]

Suzuki et al.

[11] Patent Number: 4,596,302
[45] Date of Patent: Jun. 24, 1986

[54] REAR SUSPENSION MECHANISM FOR MOTORCYCLE

[75] Inventors: Manabu Suzuki, Shizuoka; Hiroshi Murayama, Hamamatsu, both of Japan

[73] Assignee: Suzuki Jidosha Kogyo Kabushiki Kaisha, Shizuoka, Japan

[21] Appl. No.: 655,545

[22] Filed: Sep. 28, 1984

[30] Foreign Application Priority Data

May 19, 1984 [JP] Japan .................... 59-101238

[51] Int. Cl.4 ............................... B62K 25/04
[52] U.S. Cl. ........................ 180/227; 280/284
[58] Field of Search ............. 180/227, 219; 280/284, 280/283, 285

[56] References Cited

U.S. PATENT DOCUMENTS

| 4,076,271 | 2/1978 | Doncque | 280/284 |
| 4,415,057 | 11/1983 | Yamaguchi | 180/227 |
| 4,457,393 | 7/1984 | Tamaki et al. | 180/227 |
| 4,489,803 | 12/1984 | Fukuchi | 180/227 |
| 4,505,492 | 3/1985 | Tsunoda | 180/227 |
| 4,506,755 | 3/1985 | Tsuchida et al. | 180/227 |
| 4,515,236 | 5/1985 | Kanamori | 180/227 |
| 4,523,659 | 6/1985 | Yamamoto et al. | 180/227 |

FOREIGN PATENT DOCUMENTS

| 344960 | 12/1936 | Italy | 280/285 |
| 104022 | 2/1917 | United Kingdom | 180/227 |

Primary Examiner—John J. Love
Assistant Examiner—Mitchell J. Hill
Attorney, Agent, or Firm—Quaintance, Murphy & Presta

[57] ABSTRACT

Herein disclosed is a rear suspension mechanism for a motorcycle, in which a swing arm having its one end hinged to a body frame is connected to the body frame in the vicinity of the hinged portion of the swing arm through a bell crank having an eccentric bearing mechanism, and in which a cushion unit is connected between the body frame and one end of the bell crank.

15 Claims, 11 Drawing Figures

REAR SUSPENSION MECHANISM FOR MOTORCYCLE

BACKGROUND OF THE INVENTION

1. Field of the Invention

The present invention relates to a rear suspension mechanism for a motorcycle.

2. Description of the Prior Art

A rear suspension mechanism for a motorcycle according to the prior art is a type called "full floater type". This full floater type suspension mechanism is an improvement over a type, in which a cushion unit is directly connected either on a middle point of a swing arm having one end hinged to the vicinity of the center of the body and the other end to a rear axle, or on the rear axle. The full floater type suspension mechanism thus improved is schematically shown in FIG. 11 as prior art, in which the aforementioned cushion unit 26 has its one end connected to one end of a bell crank 25 made rotatable on its hinged point at the body and having its other end connected to the aforementioned swing arm 23 through a suitable cushion rod 24. The advantage obtained from that construction is that the ratio of a load upon the rear axle to the repulsive force of the cushion unit, i.e., the so-called "lever ratio" is quadratically changed, as is different from the linear change of the prior art mechanism, with respect to an axle stroke to soften the cushioning performance so that the riding comfort is remarkably improved. The prior art thus far described is well known in the art, as is disclosed in Japanese Patent Application No. 58-45388, for example.

Despite this fact, the conventional full floater type rear suspension mechanism is so constructed that the bell crank has its middle portion hinged to the body, the cushion unit is connected between the one end of that bell crank and the portion of the swing arm, and the other end of the bell crank and the other portion of the swing arm are connected through the cushion rod. As a result, there are left some points still to be improved so as to reduce the weight and size of the suspension mechanism.

SUMMARY OF THE INVENTION

It is, therefore, an object of the present invention to provide a small and light suspension mechanism which can ensure the riding comfort of a motorcycle.

According to an aspect of the present invention, there is provided a rear suspension mechanism for a motorcycle, which comprises: a swing arm having its one end hinged to a body frame and its other end hinged to a rear axle; a bell crank having its one portion hinged to the body frame in the vicinity of the hinged portion of said swing arm and its other portion hinged to a portion of said swing arm so that at least one of its two portions is through an eccentric bearing mechanism; and a cushion unit having its one end connected to said body frame and its other end connected to the end portion of said bell crank.

According to the construction of the present invention described above, the performance is not different from the aforementioned full floater type suspension mechanism. The present structure is made so that the cushion rod being used in the full floater type structure is replaced by the eccentric bearing mechanism, which is assembled in at least one of the hinged portions through which the bell crank is connected with the body frame or the swing arm, and the cushion unit has its one end connected to not the swing arm but the body frame. By that eccentric bearing mechanism, the bell crank is allowed to swing, when the swing arm swings in accordance with the vertical motions of the rear axle, so that the performance of the full floater type suspension mechanism can be ensured.

According to the present invention, the eccentric bearing mechanism is disposed at the bearing portion of the bell crank and the size and weight of the rear suspension mechanism are thereby reduced, as compared with that obtainable from the conventional member having the rod shape. Since the cushion unit is connected between the body frame and the one end of the bell crank, moreover, the space for mounting the cushion unit can be enlarged, while retaining the size of the unit, so that the performance of the cushion unit is not deteriorated even if the other mechanism of the suspension is sized down.

BRIEF DESCRIPTION OF THE DRAWINGS

In the accompanying drawings showing the preferred embodiments and effects of the present invention as well as the prior art.

DESCRIPTION OF THE PREFERRED EMBODIMENTS

Figure 1:
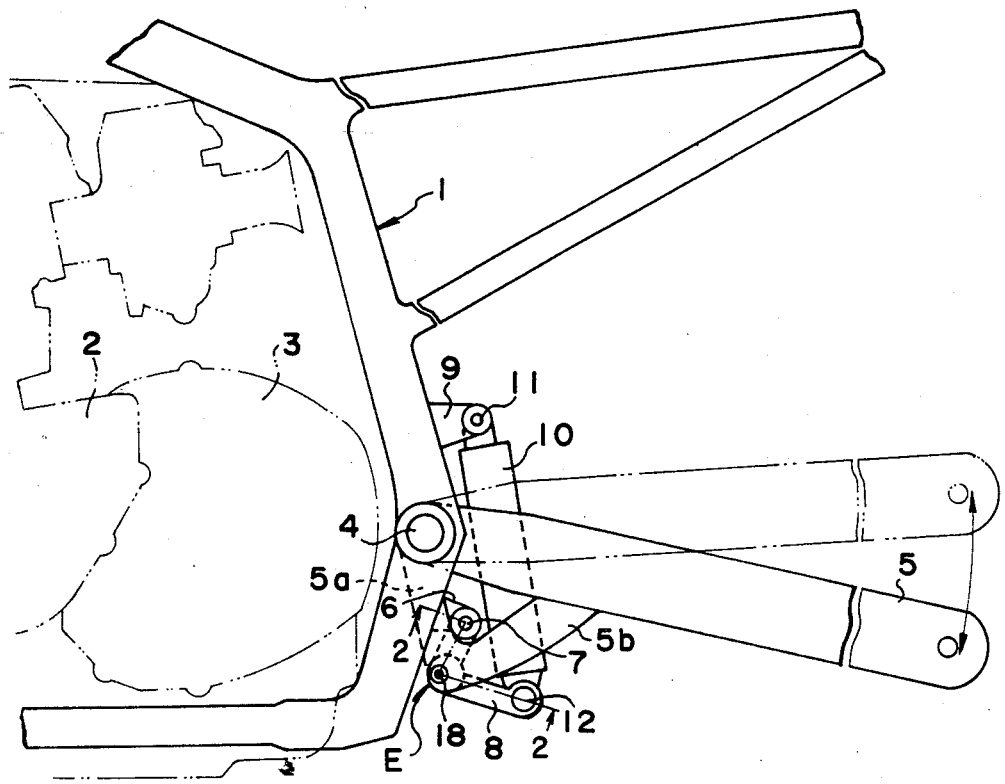
FIG. 1 is a side elevation showing an essential portion of one embodiment.

The present invention will be described with reference to the embodiment shown in FIG. 1. Indicated at reference numberal 1 is the central portion of a body frame having mounted thereon an engine 2 and a transmission 3. To the body frame 1, there are additionally attached a fuel tank, a seat and so on, which are not shown. To the central portion of the body frame 1, there is hinged by means of a pin 4 the front end of a swing arm 5 which in turn supports a rear wheel at its not-shown rear end.

From the lower portion of the body frame 1 in the vicinity of the pin 4, there protrudes backward a bracket 6 to which one end of a bell crank 8 is hinged by means of a pin 7. The bell crank 8 is formed into an L-shape. The swing arm 5 has its protrusions 5a and 5b hinged to the central (or bent) portion of the bell crank 8 through an eccentric bearing mechanism E, the details of which will be described hereinafter. A cushion unit 10 is supported by means of pins 11 and 12 between the other end of the bell crank 8 and a bracket 9 which is formed at an upper portion of the body frame 1. Incidentally, identical reference characters indicate idential members in the subsequent figures.

Figure 2:
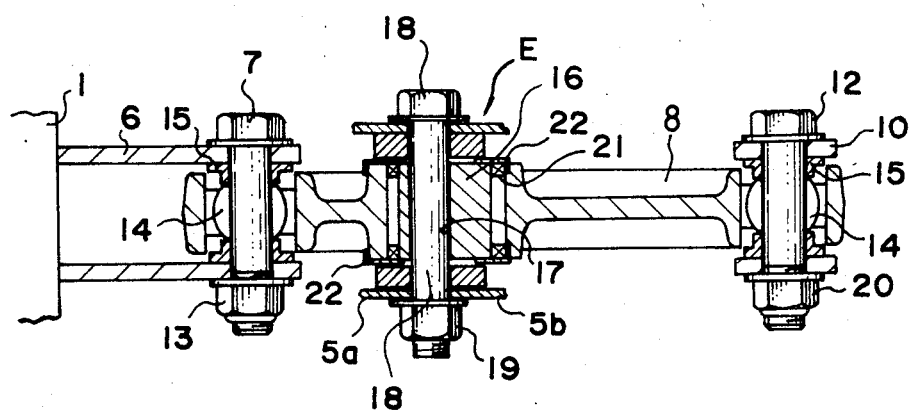
FIG. 2 is a sectional view showing a bell crank and its mounted state and an eccentric bearing mechanism of the embodiments of FIG. 1.

FIG. 2 is a horizontal section showing the bearings and the eccentric bearing mechanism of the bell crank 8 of FIG. 1. As shown, two brackets 6 protrude from the frame 1, parallel to each other, between which one end of the bell crank 8 is inserted and hinged by means of a nut 13 to the pin 7 exemplified by a bolt. Numerals 14 and 15 indicate a ball bearing and a sealing member, respectively. A cylindrical bearing member 16 is fitted in the central (or bent) portion of the bell crank 8.

Bearing member 16 is formed at its eccentric position with a hole 17, in which a bolt 18 is fitted to hold the protrusions 5a and 5b of the swing arm 5, which are borne thereon at the two sides of the bearing member 16, by means of its head 18' and a nut 19. Since the hole 17 of the bearing member 16 is located at the eccentric position, the bell crank 8 can eccentrically move with respect to the bell crank 8 in accordance with the loaded direction when it rotates. The cushion unit 10 has its lower bracket portion hinged to the other end of the bell crank 8 by means of the pin 12 acting as a bolt and a nut 20. Incidentally, reference numerals 21 and 22 appearing in FIG. 2 indicate an oil seal and a dust seal, respectively.

FIGS. 3, 4, 5, 6 and 7 show alternate embodiments of the present invention. Modifications of the structural elements shown in FIG. 1 are designated in FIGS. 3-7 by reference numbers having the same last two digits as the elements shown in FIG. 1. For example, the bell crank which is designated by the Reference Number "8" in FIG. 1 is numbered "308" in FIG. 3, "408" in FIG. 4, "508" in FIG. 5, "608" in FIG. 6 and "708" in FIG. 7.

Figure 3:
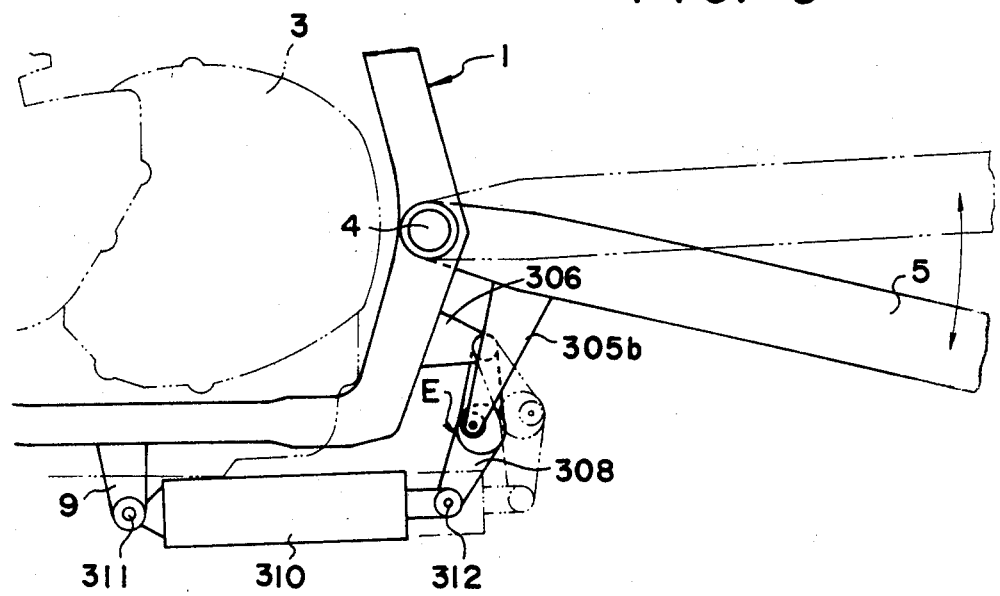
FIG. 3 is a side elevation of an alternative embodiment of the present invention.

FIG. 3 shows an alternative embodiment in which the cushion unit 310 is attached in a horizontal position to the lower side of the body frame 1. This arrangement makes the size reduction of the suspension mechanism more effective by arranging the cushion unit by making use of the space below the body frame. This is because the cushion unit should not be so small-sized from the view point of its performance as a cushion.

Figure 4:
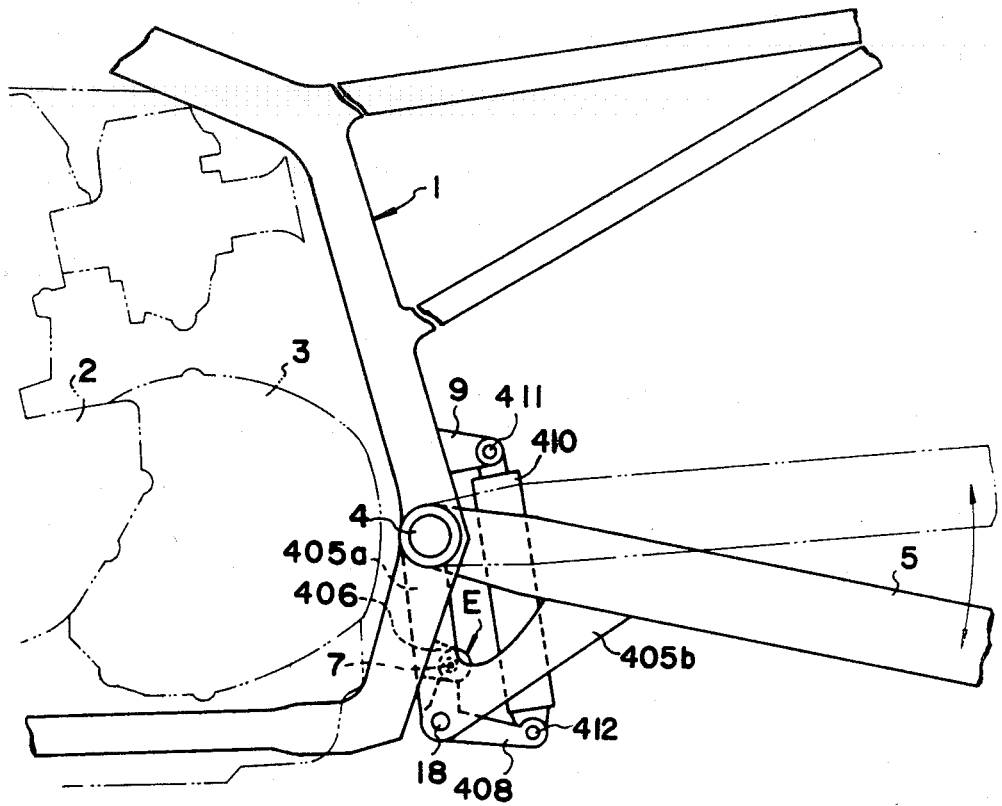
FIG. 4 is a side elevation showing another embodiment.
Figure 5:
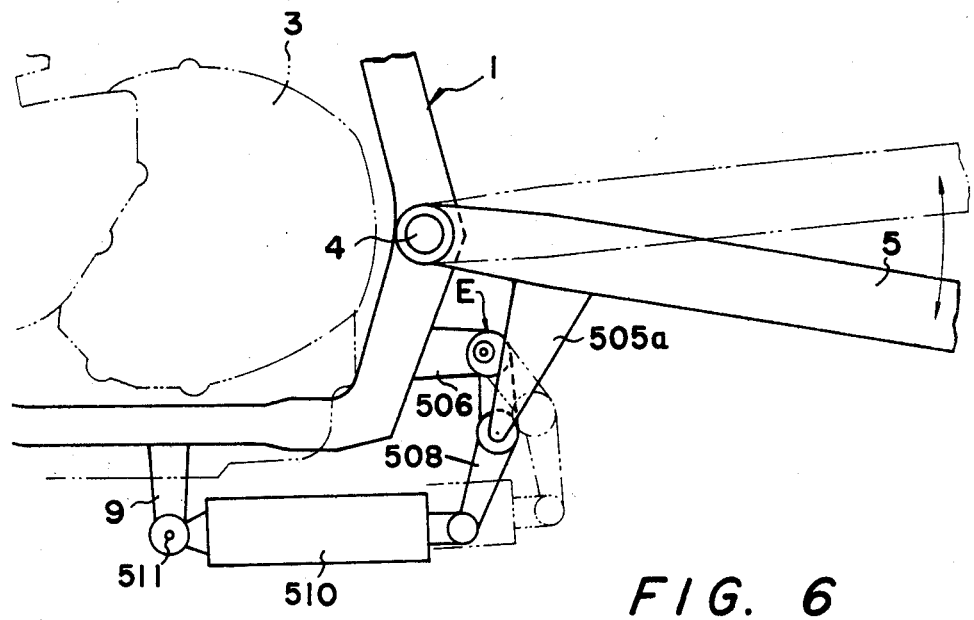
FIG. 5 is a side elevation of an alternative embodiment of the present invention.

FIG. 4 shows another embodiment of the present invention, in which the eccentric bearing mechanism E is used at the bearing portion of the bell crank 408 on the brackets 406. The eccentric bearing mechanism E may be absolutely identical to that shown in FIG. 2 and performs the identical function to permit a free swinging motion of the swing arm. In this embodiment, the cushion unit is attached in a vertical direction but can be attached in a horizontal direction to the lower side of the body frame for the same reason as that which has been described with reference to FIG. 3, as shown in FIG. 5.

Figure 7:
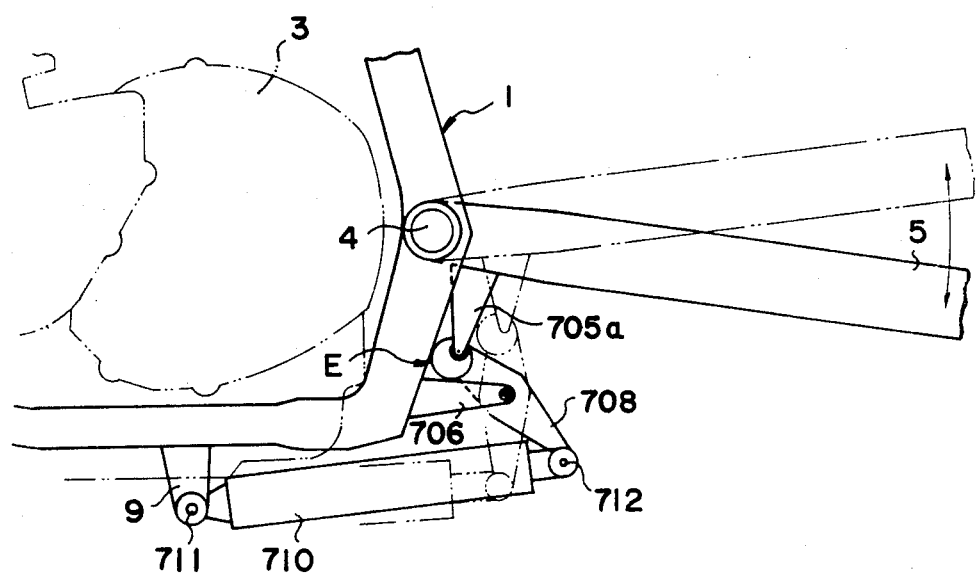
FIG. 7 is a side elevation showing a further embodiment.
Figure 11:
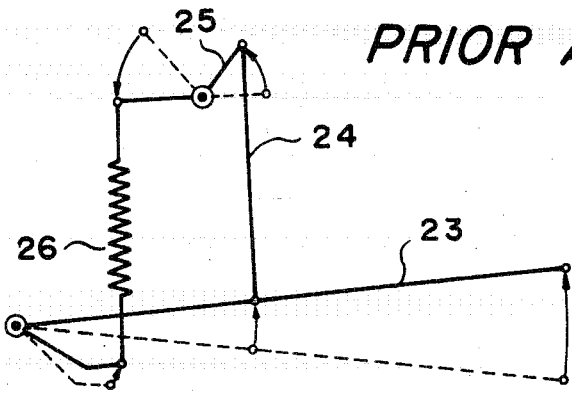
FIG. 11 is a schematic diagram showing the prior art.
Figure 6:
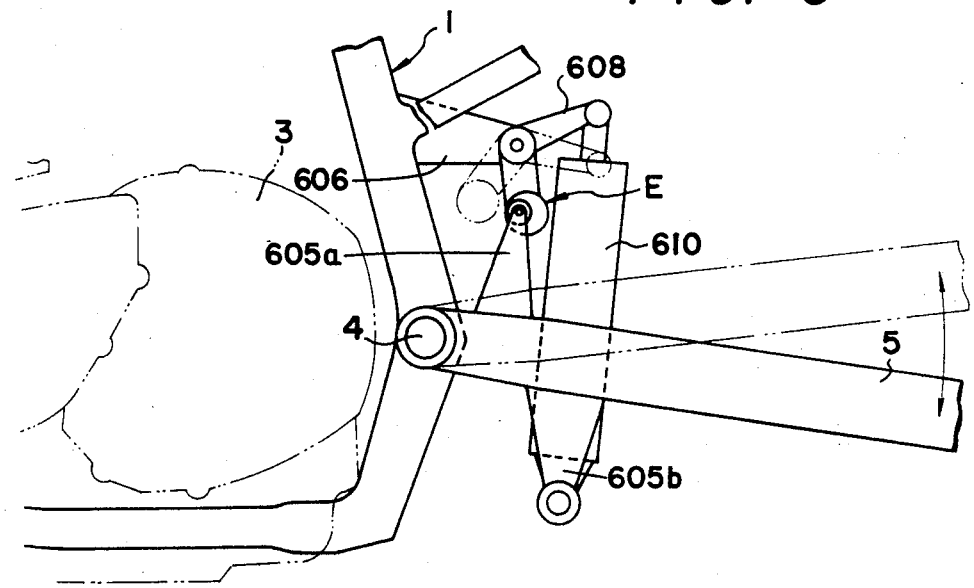
FIG. 6 is a side elevation showing still another embodiment.

In still another embodiment shown in FIG. 6, the cushion rod of the full floater suspension mechanism shown in FIG. 11, which is hinged in a rotatable manner between the middle point of the swing arm 23 and the one end of the bell crank 25, is dispensed with, and in the place of it a protrusion 605a fixed to the swing arm 5 is hinged to one end of the bell crank 608. FIG. 7 shows one modification of the embodiment shown in FIG. 6, in which one end of the cushion unit is connected to the body frame.

In any one of the embodiments thus far described, the vertical vibrations of the rear wheel when the motorcycle runs are transmitted from the swing arm 5 through the bell crank 8 to the cushion unit 10, in which they are damped. In this case, whether the eccentric bearing mechanism E is positioned at the central or end portion of the bell crank causes no difference in view of the function to permit the swinging motions of the swing arm. Only from the standpoint of designing the suspension mechanism in a small size, the mounting position of the eccentric bearing mechanism E may be selected considering the arrangement of the surrounding parts. This selecting range can be drastically enlarged according to the present invention. This discussion likewise applies to the selection of the vertical or horizontal arrangement of the cushion unit.

Figure 8:
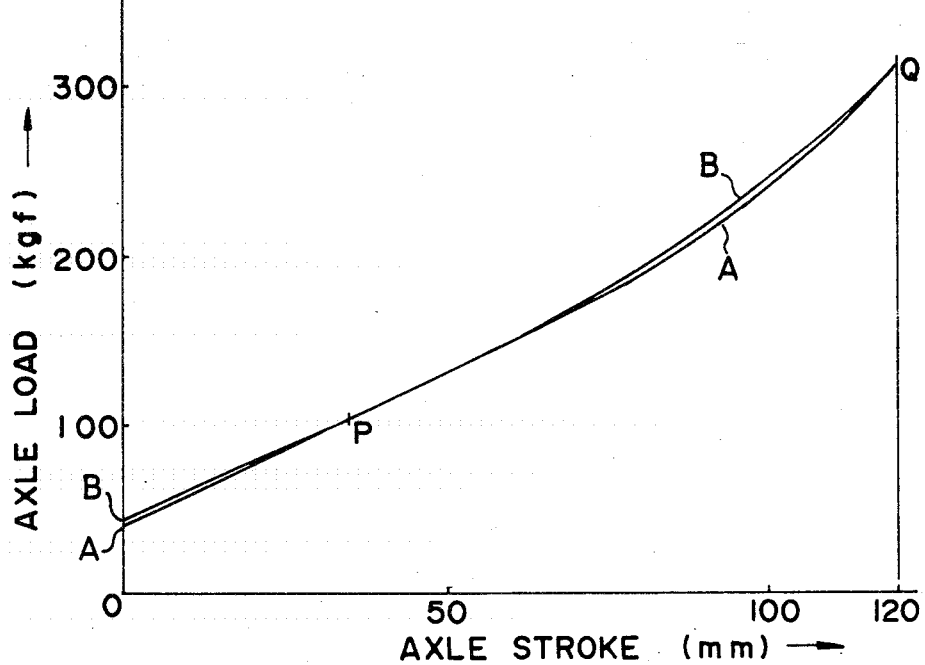
FIG. 8 is a graph showing the relationship between the axle stroke and the axle load in the cushion units of the embodiments of FIGS. 1 and 4.

Next, FIG. 8 plots the relationship between the axle stroke and the axle load of the cushion unit 10. A curve A corresponds to the embodiment of FIG. 1, and a curve B corresponds to the embodiment of FIG. 4. As is apparent from FIG. 8, the two embodiments are identical at a point P of intersection between the two curves A and B, i.e., in the characteristics of a stroke 35 mm and a load of 103 Kgf, and at a maximum stroke position Q, i.e., in the characteristics of a stroke of 120 mm and a load of 314 Kgf. However, the two embodiments are plotted to have such quadratic curves as will rise more or less so that their characteristics are identical to those obtainable from the full floater type suspension mechanism shown in FIG. 11. It is, therefore, found that the suspension mechanism of the present invention can provide riding comfort and withstand a high load.

Figure 9:
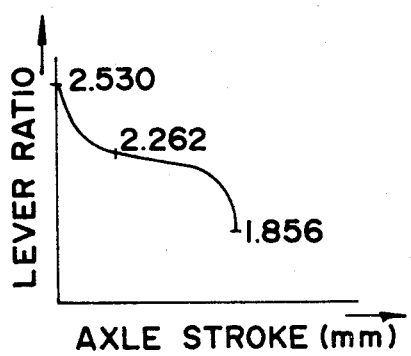
FIG. 9 is a graph showing the relationship between the axle stroke and the lever ratio in the embodiment of FIG. 1.
Figure 10:
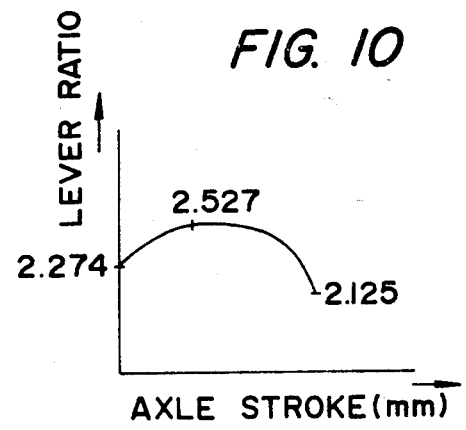
FIG. 10 is a graph showing the relationship between the axle stroke and the lever ratio in the embodiment of FIG. 4.

FIGS. 9 and 10 plot the relationships between the axle stroke and the lever ratio, i.e., the ratio of the load upon the rear axle to the repulsive force of the cushion unit. FIG. 9 shows the relationship of the embodiment of FIG. 1, whereas FIG. 10 shows the relationship of the embodiment of FIG. 4. From these figures, it is seen that the embodiment of FIG. 1 is soft at the beginning, i.e., at the compression starting point, tough at the middle and can stand a considerable load at the bottom, i.e., at the maximum compression. On the other hand, the embodiment of FIG. 4 has an attenuation at the beginning, is soft at the middle and can also stand a considerable load at the bottom.

According to the present invention thus far described, the connecting member called the push or pull rod, which is an indispensable component of the full floater type suspension mechanism of the prior art, is replaced by the compact eccentric mechanism so that the size and weight of the suspension mechanism can be reduced as a whole. Moreover, the degrees of freedom of setting the lever ratio is increased so that an ideal cushion performance can be attained.

What is claimed is:

1. A rear suspension mechanism for a motorcycle, comprising:
   a swing arm having one end supporting a rear axle and its other end hinged to a body frame;
   a bell crank having a first portion hinged to the body frame in the vicinity of the hinged end of said swing arm and a second portion hinged to a portion of said swing arm such that at least one of the two portions of the bell carnk is hinged through an eccentric bearing mechanism, said eccentric bearing mechanism having an eccentric axis of rotation; and a cushion unit, one end of said cushion unit being connected to said body frame and the other end of said cushion unit being connected to a third portion of said bell crank.

2. A rear suspension mechanism according to claim 1, wherein said bell crank has a central portion hinged to said swing arm through said eccentric bearing mechanism.

3. A rear suspension mechanism according to claim 1, wherein said bell crank has one end portion hinged to said body frame through said eccentric bearing mechanism and its central portion hinged to said swing arm.

4. A rear suspension mechanism according to claim 1, wherein said bell crank has its central portion hinged to said body frame and its one end hinged to said swing arm through said eccentric bearing mechanism.

5. A rear suspension mechanism according to claim 1, wherein said cushion unit is arranged to extend and contract generally in a vertical direction.

6. A rear suspension mechanism according to claim 1, wherein said cushion unit is arranged to extend and contract generally in a horizontal direction.

7. A rear suspension mechanism for a motorcycle comprising:
  A. a swing arm having a first end supporting a rear axle and a second end hinged to a body frame; and
  B. a bell crank having a first end portion, a second end portion and a central portion, said central portion being located between said first end portion and said second end portion of the bell crank, the first end portion being hinged to the body frame in the vicinity of the hinged end of said swing arm and said central portion being hinged to said swing arm such that at least one of said first end portion and said central portion of the bell crank is hinged through an eccentric bearing mechanism; and
  C. a cushion unit having one end connected to said body frame and the other end connected to the second end portion of the bell crank.

8. A rear suspension mechanism for a motorcycle comprising:
  A. a swing arm having a first end supporting a rear axle and a second end hinged to a body frame; and
  B. a bell crank having a first end portion, a second end portion, and a central portion, said central portion being located between said first end portion and said second end portion, the first end portion being hinged to said swing arm and the central portion being hinged to the body frame in the vicinity of the hinged end of said swing arm such that at least one of said first end portion and said central portion of the bell crank is hinged through an eccentric bearing mechanism; and
  C. a cushion unit having one end connected to said body frame and the other end connected to the second end portion of the bell crank.

9. A rear suspension mechanism for a motorcycle comprising:
  A. a swing arm having a rear end supporting a rear axle and a front end hinged to a body frame of the motorcycle, said swing arm being provided with a first protrusion and a second protrusion, said first protrusion extending from said front end and said second protrusion extending from said swing arm at a position intermediate said front end and said rear end; and
  B. a bell crank having a first end, a second end and an elbow therebetween, said bell crank being hinged at its first end to a first bracket carried by the body frame, said first bracket being located below the front end of the swing arm on said body frame, and said bell crank having an eccentric bearing mechanism through the elbow, said first protrusion and said second protrusion of the swing arm being hinged to the bell crank through said eccentric bearing mechanism; and
  C. a cushion unit having an upper end and a lower end, the lower end of said cushion unit being connected to the second end of the bell crank and the upper end of said cushion unit being connected to the body frame by a second bracket carried by said body frame, said second bracket being located above the front end of the swing arm on said body frame.

10. A rear suspension mechanism for a motorcycle comprising:
  A. a swing arm having a rear end supporting a rear axle and a front end hinged to a body frame of the motorcycle, said swing arm being provided with a protrusion extending from said swing arm at a position intermediate said front end and said rear end; and
  B. a bell crank having a first end, a second end and an elbow therebetween, said bell crank being hinged at its first end to a first bracket carried by the body frame, said first bracket being located below the front end of the swing arm on said body frame, and said bell crank having an eccentric bearing mechanism through the elbow, said protrusion of the swing arm being hinged to the bell crank through said eccentric bearing mechanism; and
  C. a cushion unit having a first end and a second end, the second end of said cushion unit being connected to the second end of the bell crank and the first end of said cushion unit being connected to the body frame by a second bracket carried by said body frame.

11. A rear suspension mechanism for a motorcycle comprising:
  A. a swing arm having a rear end supporting a rear axle and a front end hinged to a body frame of the motorcycle, said swing arm being provided with a first protrusion and a second protrusion, said first protrusion extending from said front end and said second protrusion extending from said swing arm at a position intermediate said front end and said rear end; and
  B. a bell crank having a first end, a second end and an elbow therebetween, said bell crank being hinged through an eccentric bearing mechanism at its first end to a first bracket carried by the body frame, said first bracket being located below the front end of the swing arm on said body frame, and said bell crank being hinged at the elbow to said first protrusion and said second protrusion of the swing arm; and
  C. a cushion unit having an upper end and a lower end, the lower end of said cushion unit being connected to the second end of the bell crank and the upper end of said cushion unit being connected to the body frame by a second bracket carried by said body frame.

12. A rear suspension mechanism for a motorcycle comprising:

A. a swing arm having a rear end supporting a rear axle and a front end hinged to a body frame of the motorcycle, said swing arm being provided with a protrusion extending from said swing arm at a position intermediate said front end and said rear end; and B. a bell crank having a first end, a second end and an elbow therebetween, said bell crank being hinged through an eccentric bearing mechanism at its first end to a first bracket carried by the body frame, said first bracket being located below the front end of the swing arm on said body frame, and said bell crank being hinged at the elbow to said protrusion of the swing arm; and C. a cushion unit having a first end and a second end, the second end of said cushion unit being connected to the second end of the bell crank and the first end of said cushion unit being connected to the body frame by a second bracket carried by said body frame.

13. A rear suspension mechanism for a motorcycle comprising:

A. a swing arm having a rear end supporting a rear axle and a front end hinged to a body frame of the motorcycle, said swing arm being provided with a protrusion extending from said swing arm at a position intermediate said front end and said rear end; and B. a bell crank having a first end, a second end and an elbow therebetween, said bell crank being hinged at its elbow to a first bracket carried by the body frame, said first bracket being located below the front end of the swing arm on said body frame, and said bell crank having an eccentric bearing mechanism through the first end, said protrusion of the swing arm being hinged to the bell crank through said eccentric bearing mechanism; and C. a cushion unit having a first end and a second end, the second end of said cushion unit being connected to the second end of the bell crank and the first end of said cushion unit being connected to the body frame by a second bracket carried by said body frame.

14. A rear suspension mechanism for a motorcycle comprising:

A. a swing arm having a rear end supporting a rear axle and a front end hinged to a body frame of the motorcycle, said swing arm being provided with a first protrusion and a second protrusion, said first protrusion extending upwardly from said swing arm at a point intermediate said front end and said rear end, and said second protrusion extending downwardly from said swing arm at a position intermediate said first protrusion and said rear end; and B. a bell crank having a first end, a second end and an elbow therebetween, said bell crank being hinged at its elbow to a first bracket carried by the body frame, said first bracket being located above the front end of the swing arm on said body frame, and said bell crank having an eccentric bearing mechanism through the first end, said first protrusion of the swing arm being hinged to the bell crank through said eccentric bearing mechanism; and C. a cushion unit having an upper end and a lower end, the lower end of said cushion unit being connected to the second protrusion of the swing arm and the upper end of said cushion unit being connected to the second end of the bell crank.

15. A rear suspension mechanism for a motorcycle comprising:

A. a swing arm having a first end supporting a rear axle and a second end hinged to a body frame; and B. a bell crank having a first end, a second end and an elbow therebetween, said first end being hinged to the body frame in the vicinity of the hinged end of said swing arm and said elbow being hinged to said swing arm such that at least one of said first end and said elbow of the bell crank is hinged through an eccentric bearing mechanism, said eccentric bearing mechanism comprising a cylindrical bearing member having a passage therethrough, said passage extending through said cylindrical bearing member at an eccentric position of said cylindrical bearing member, and a bolt extending through said passage of said cylindrical bearing member; and C. a cushion unit having one end connected to said body frame and the other end connected to the second end of the bell crank.

* * * * *